DISTORTION COMPENSATION SYSTEM, FOR A POWER FREQUENCY AMPLIFIER SYSTEM HAVING TRANSPORT LAGS, UTILIZING HETERODYNE FEEDBACK

Filed July 31, 1961

INVENTORS,
GEORGE S. AXELBY
EUGENE F. OSBORNE
EDWARD L. SMITH, JR.

BY Jack H. Linscott

ATTORNEY.

United States Patent Office 3,141,134
Patented July 14, 1964

3,141,134

DISTORTION COMPENSATION SYSTEM, FOR A POWER FREQUENCY AMPLIFIER SYSTEM HAVING TRANSPORT LAGS, UTILIZING HETERODYNE FEEDBACK

Eugene F. Osborne, Catonsville, George S. Axelby, Linthicum, and Edward L. Smith, Jr., Baltimore, Md., assignors, by mesne assignments to the United States of America as represented by the Secretary of the Army Filed July 31, 1961, Ser. No. 128,272
5 Claims. (Cl. 325—159)

This invention relates to distortion correction means, and more particularly to a heterodyne feedback system for correcting distortion in communications equipment such as SSB transmitters or the like.

In communications and information handling systems it is frequently desirable or even necessary to compensate for both AM and PM distortion of the frequency spectrum of the complex signals present in the system. This is especially true where the distortion is due to the nonlinearity of the output power stages.

Several different distortion compensation systems are known in the art. In one such system, direct carrier feedback is used to compensate for distortion. In another system envelope feedback is used. Unfortunately, these methods are not satisfactory for all applications. If the output device is a klystron or a traveling wave amplifier, direct carrier feedback is impossible because these output devices have a long inherent time delay. Similarly, envelope feedback is not satisfactory for single-sideband systems because this type of feedback does not preserve the frequency spectrum as a function of time. Thus, accurate fidelity of the output is not obtained by envelope feedback.

Our invention overcomes the above mentioned prior art difficulties, and is particularly useful in systems normally operating with bandpass characteristics. A single sideband communications set is an example of such a bandpass system.

Basically, our invention consists of feeding back the RF output from a transmitter power amplifier stage to the input of a preceding stage of the transmitter. The feedback path contains a frequency converter stage, and may contain an amplifier and a phase controlling device. This feedback arrangement provides effective compensation for both phase and amplitude distortions which are introduced by the transmitter circuits or by noise inputs.

Therefore, an object of our invention is to provide distortion compensation in a communications system.

Another object of our invention is to provide a heterodyne feedback system for distortion compensation.

A further object of our invention is to provide distortion compensation in systems using klystrons, or traveling-wave tubes as power amplifiers.

These and other objects will become apparent from the following description and accompanying drawings, in which.

Figure 1:
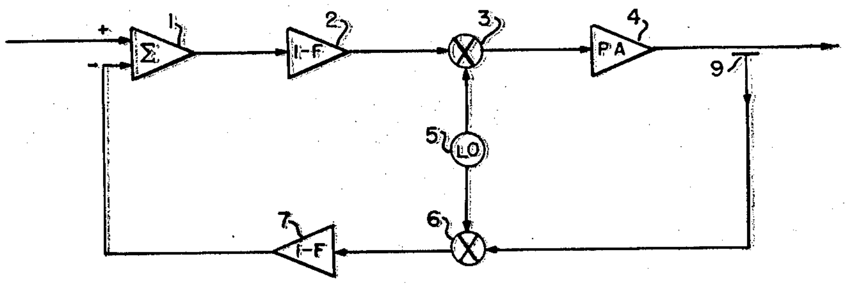
FIG. 1 is a block diagram of the basic distortion compensation system of the invention.

The block diagram of FIG. 1 shows our invention as it is used in an SSB transmitter. Amplifiers 2 and 4, mixer 3, and local oscillator 5 represent a portion of a standard SSB transmitter. Amplifier 1, which is a summation amplifier, is a part of our inventive addition to the transmitter. Single-sideband signals are applied to summation amplifier 1 and the output of this amplifier is applied to I-F amplifier 2. The output of amplifier 2 is mixed in converter 3 with the output of local oscillator 5. The converted signals are then applied to power amplifier 4. The output of amplifier 4 is not only applied to some suitable load device such as an antenna, but a part of this ouput is also returned by attenuating coupling 9 to the input of summation amplifier 1. However, as is shown in FIG. 1, the output of amplifier 4 is not directly returned to the input of amplifier 1. Direct feedback is not used because this would result in instability due to the phase distortion introduced by amplifier 4.

A frequency converter 6 and an I-F amplifier 7 are included in the feedback path to maintain stability. By taking advantage of the character of a heterodyne system all the beneficial effects of direct RF feedback are obtained without the stability problems inherent in direct RF feedback. The phase ambiguity of heterodyne-frequency conversion is utilized to keep the feedback negative. Thus, the system is stable.

The feedback arrangement of FIG. 1 effectively compensates for both phase and amplitude distortions which are introduced by the forward amplifiers and other noise inputs. However, if power amplifier 4 is either a klystron or traveling wave tube, the system of FIG. 1 may tend to oscillate. This tendency toward instability is due to the dynamic phase distortion introduced by the power amplifier. If the variation of the dynamic distortion becomes too great the system of FIG. 1 may oscillate.

Figure 2:
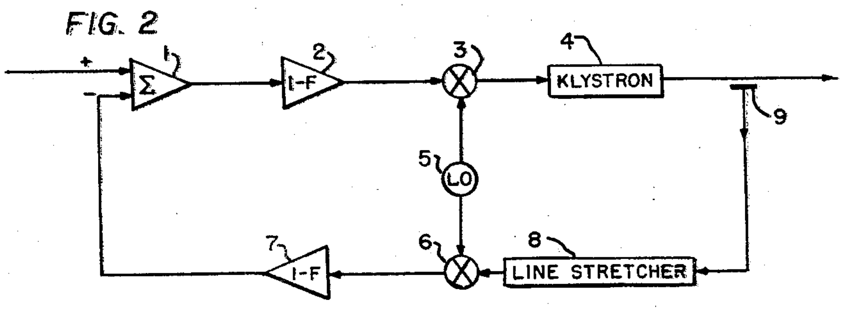
FIG. 2 is a block diagram of a modification of the invention.

The system shown in FIG. 2 overcomes this dynamic phase-distortion problem. This system is, with the exception of line stretcher 8, identical to the system shown in FIG. 1. Line stretcher 8 is used to adjust the phase angle of the output from amplifier 4 in such a manner that negative feedback is maintained even though amplifier 4 introduces a highly variable dynamic phase distortion. Line stretcher 8 may be any suitable phase-shifting device such as a delay line or the like.

Figure 3:
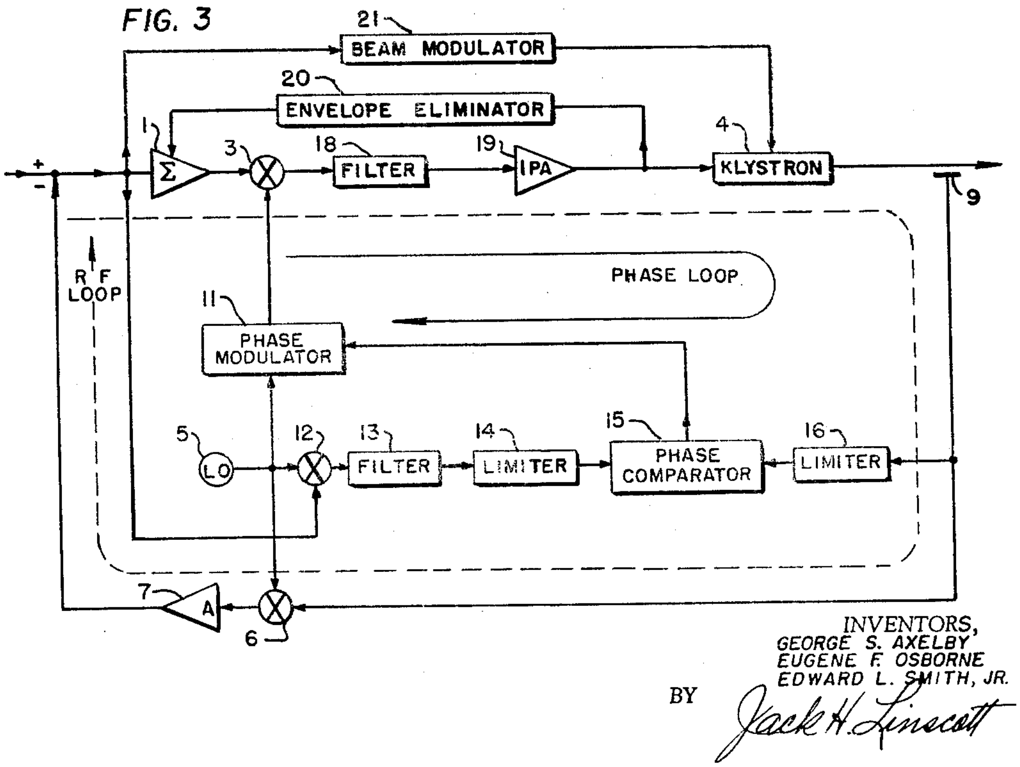
FIG. 3 is a block diagram of a further modification of the invention.

If the communications system in which our distortion compensation system is used includes a beam-modulated klystron, the simple phase adjustment device of FIG. 2 may not be sufficient to overcome the large phase distortions produced by the beam-modulation process. Thus, the more sophisticated phase control system of FIG. 3 is needed for complete distortion compensation. In FIG. 3, amplifiers 1, 19 and 4, converter 3, filter 18, beam modulator 21, and envelope eliminator 20 again represent a portion of a single-sideband transmitter. A simple RF feedback path including amplifier 7 and converter 6 returns a part of the output at 9 from klystron amplifier 4 to the input of summation amplifier 1. For all practical purposes the part of FIG. 3 thus far described is identical to the system shown in FIG. 1. In addition to the RF feedback loop, the system of FIG. 3 includes a phase control loop. This phase control loop compares the phase of the input signal with the phase of the output signal from amplifier 4. If any phase difference exists between these signals, phase modulator 11 modulates the local oscillator input to converter 3. This phase control function is accomplished by the elements 5 and 11 through 16.

The output from amplifier 4 is applied to phase comparator 15 through limiter 16. At the same time the input signal is applied to comparator 15 through converter 12, filter 13 and limiter 14. Converter 12 has its second input connected to local oscillator 5 and increases the frequency of the input signal.

If there is no phase angle difference between the two inputs to comparator 15, its output will be zero. If, on the other hand, there is a phase difference between these inputs, the output from comparator 15 will be either negative or positive, depending on the sign of the phase difference. This output from comparator 15 is applied to phase modulator 11 and its output is used to modulate the output of local oscillator applied to converter 3. Thus the system of FIG. 3 uses both an RF feedback loop and a phase-control loop to obtain the desired distortion compensation.

From the foregoing remarks it is apparent that more complete distortion compensation can be obtained the system shown in FIG. 3 than that obtained with the systems of FIGS. 1 and 2. However, it is also apparent that the system of FIG. 3 is more complex than the other two systems. Thus, from the standpoint of simplicity of design and expense, the system of FIG. 3 would probably be used only when the systems of FIGS. 1 and 2 will not provide adequate compensation. Of course, numerous modifications of the three illustrative embodiments will be apparent to those skilled in the art; therefore, we intend to be limited only by the limitations set forth in the appended claims.

What is claimed is:

1. A distortion compensation system for a power amplifier system comprising: a frequency converter having two inputs; means to apply distorted signals to one of said converter inputs; a local oscillator coupled to the other of said converter inputs; an amplifier coupled to said converter; a summation amplifier coupled to said amplifier; means to apply a complex signal to said summation amplifier; means including said power amplifier system to couple the output of said summation amplifier to said means to apply distorted signals; a first limiter; means to apply said distorted signals to said limiter; a phase comparator coupled to said first limiter; a second frequency converter; means to couple said complex signals to said second converter; means to couple said local oscillator to said second converter; a filter coupled to said second converter; a second limiter coupled between said filter and said phase comparator; a phase modulator coupled to said comparator; means to couple said local oscillator to said phase modulator; and a third frequency converter coupled to said modulator and to said summation amplifier.

2. A radio transmitter signal distortion compensation system comprising: an RF feedback loop having a frequency converter and an amplifier serially connected between the final output stage of said transmitter and a stage of said transmitter preceding said output stage; and means coupled between said output stage and said preceding stage for comparing the phase of the signal present at said output stage with the phase of the signal present at said preceding stage; and means coupled to said phase-comparing means for compensating discrepancies in said phase relationships.

3. A single sideband transmitter comprising: a summation amplifier having a first and a second input; means to couple single-sideband signals to said first summation amplifier input; a first frequency converter; a first I-F amplifier coupled between said summation amplifier and said first converter; a local oscillator coupled to said first converter; a power amplifier; means coupling said power amplifier to the output of said first converter; a second converter coupled to said local oscillator and to the output of said power amplifier; and a second I-F amplifier coupled between the output of said second converter and said second summation amplifier input.

4. The single sideband transmitter set forth in claim 3 wherein a line stretcher is coupled between said second converter and the output of said power amplifier.

5. A single sideband transmitter comprising: a summation amplifier having first, second, and third inputs; means to apply single sideband signals to said first summation amplifier input; a first frequency converter coupled to the output of said summation amplifier; an intermediate power amplifier; a first filter coupled between said first converter and said intermediate power amplifier; a final power amplifier coupled to said intermediate power amplifier; a second converter coupled to the output of said final power amplifier; an amplifier coupled between said second converter and said second summation amplifier input; a beam-modulator having an input coupled to said first summation amplifier input and an output coupled to said power amplifier; an envelope eliminator coupled between said third summation amplifier input and the junction between said intermediate power amplifier and said final power amplifier; a first limiter coupled to the output of said final power amplifier; a phase comparator having two inputs and an output; means to couple said first limiter to one of said comparator inputs; a third frequency converter; means to couple said single sideband signals to said third converter; a second filter coupled to the output of said third converter; a second limiter coupled between said second filter and the other of said comparator inputs; a phase modulator coupled between said first converter and said comparator output; and a local oscillator coupled to said second and third converters and to said phase modulator.

References Cited in the file of this patent

UNITED STATES PATENTS

| | | |
|---|---|---|
| 2,048,080 | Potter | July 21, 1936 |
| 2,415,874 | Goldstine | Feb. 18, 1947 |
| 2,820,138 | Haard | Jan. 14, 1958 |
| 2,912,570 | Holzwarth et al. | Nov. 10, 1959 |